(12) United States Patent
Brooks et al.

(10) Patent No.: US 7,640,209 B1
(45) Date of Patent: Dec. 29, 2009

(54) PROCESS FOR AN INCLUSIVE AUTOMATED CONSUMER CONTROLLED MORTGAGE SYSTEM (ACCMS) CONTAINING AN AUTOMATED MORTGAGE MONITORING AND GOVERNMENT COMPLIANCE AUDITING SYSTEM

(76) Inventors: Ronald L. Brooks, 1590 Sunflower Ct., Winter Park, FL (US) 32792; Christopher Jon Gootos, 3 Captains Walk, Setauket, NY (US) 11733

( * ) Notice: Subject to any disclaimer, the term of this patent is extended or adjusted under 35 U.S.C. 154(b) by 0 days.

(21) Appl. No.: 12/032,685

(22) Filed: Feb. 17, 2008

Related U.S. Application Data

(60) Provisional application No. 60/902,269, filed on Feb. 20, 2007.

(51) Int. Cl.
*G06Q 40/00* (2006.01)
(52) U.S. Cl. ...................................................... 705/38
(58) Field of Classification Search ............... 705/1–45; 713/176; 706/12; 707/102, 104; 709/232; 715/700; 235/382; 294/171; 345/156
See application file for complete search history.

(56) References Cited

U.S. PATENT DOCUMENTS

| | | | | |
|---|---|---|---|---|
| 5,285,383 A * | 2/1994 | Lindsey et al. | ................. | 705/26 |
| 2002/0138414 A1* | 9/2002 | Baker, IV | .................... | 705/38 |
| 2002/0152155 A1* | 10/2002 | Greenwood et al. | ........... | 705/38 |
| 2005/0197953 A1* | 9/2005 | Broadbent et al. | ............ | 705/38 |
| 2006/0271473 A1* | 11/2006 | Pollock et al. | ................. | 705/38 |
| 2008/0103970 A1* | 5/2008 | Books et al. | ................... | 705/39 |

OTHER PUBLICATIONS

Automated underwriting targets the branch, O Sullivan, Orla, US Banker v108n8 pp. 48-50+, Aug. 1998.*

* cited by examiner

*Primary Examiner*—Mary Cheung
*Assistant Examiner*—Tien C Nguyen

(57) ABSTRACT

A system and method completely eliminating the tasks and responsibilities of the mortgage broker, loan officer, and Federally Chartered Banks in the mortgage loan process, thus transforming the Consumer/Borrower's (Consumer) Personal Computer into a Personal Mortgage Company (PMC) establishing a consumer "do-it-yourself" mortgage process bestowing the Consumer the ability and control to complete all processes needed to complete a mortgage loan, from application to closing. Within the system is an automated mortgage monitoring environment initiated each time a Consumer enters the loan environment and for amplified consumer security and confidence; Quality Control stations which monitor and records conversations between the Consumer and the consumer service representative, plus keystroke and ID recording of any consumer service representative that intervened on a loan, and a State and Federal regulator portal which allows financial audits in complete anonymity 24 hours a day, 7 days a week, 365 days a year remotely.

11 Claims, 11 Drawing Sheets

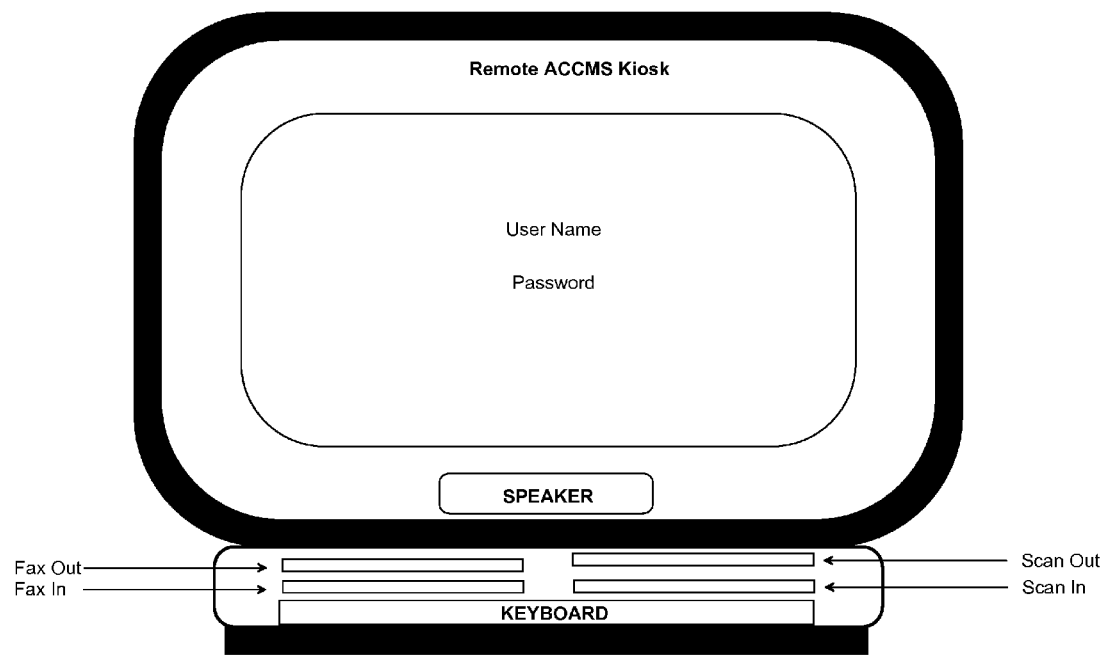

| Date/Time | | | Station# | | | | Admin. ID | | | |
|---|---|---|---|---|---|---|---|---|---|---|
| Number | Enter Time | Location | Phone # | Assisted | Duration | Admin. | Lender | Visit | Idle |
| 44 | 10:02am | Homepage | 555-555-5564 | NO | 6.5 min. | 331A | WF | 1 | 0 |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| Total | | | | | Intervene Dial | Log-Off Loan Alert | Email Intranet | | Calculator IM |

Color Coded Monitoring (left)
ADMIN Terminals (right)

FIG. 5

| Date/Time | | | Station# | | | | | | CSR-ID |
|---|---|---|---|---|---|---|---|---|---|
| Loan# | Name | Phone # | State | Loan Type | App. Pg. | Duration | CSR | Stage | Visit | Idle |
| JZ445X | Jones | 203-665-7895 | AZ | Pur. | 3 | 6.5 min. | 388T | 3rd | 1 | 0 |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| Total | | | | | | Intervene Dial | Log-Off Loan Alert | Email Intranet | Calculator IM |

Color Coded Monitoring (left)
CSR Terminals (right)

FIG. 5a

| Date/Time | | | | Station# | | | | QC-ID | |
|---|---|---|---|---|---|---|---|---|---|
| CSR-ID | Station# | Name | #QC | | | | | | |
| 389J | 13 | Peters | 2 | | CSR Grade Sheet | | | | |
| 420B | 4 | Sanchez | 0 | CSR-420B | | | | Sanchez | |
| | | | | | Excellent | Good | Fair | Poor | |
| | | | | 1. Introduction | ○ | ● | ○ | ○ | |
| | | | | 2. Politeness | ○ | ● | ○ | ○ | |
| | | | | 3. Thoroughness | ○ | ○ | ● | ○ | QC Monitor |
| | | | | 4. Knowledge | ○ | ○ | ● | ○ | |
| | | | | 5. Confidence | ○ | ○ | ○ | ● | |
| | | | | | | | | | |
| | | | | | | | | | |
| | | | | Total Score | | 340 | | | |
| | | | | | | | | | |

FIG. 6

Corp/Manager

Fig 7

| Administration | | | | | | | | |
|---|---|---|---|---|---|---|---|---|
| Admin. | Idle Time | Time Logged On | Intervened | Assists | Per Hour | Team | Avg. Idle | Conversion |
| A6532 | 30 | 4:56 | 25 | 41 | 7.5 | Alpha | .56 | 23% |
| | | | | | | | | |
| | | | | | | | | |
| | | | | | | | | |
| | | | | | | | | |
| Consumer Service Representative | | | | | | | | |
| CSR | Idle Time | Time Logged On | Intervened | Assists | Per Hour | Team | Avg. Idle | Conversion |
| C4464 | 45 | 6:40 | 63 | 78 | 8.2 | Echo | .38 | 46% |
| | | | | | | | | |
| | | | | | | | | |
| | | | | | | | | |
| | | | | | | | | |

Operations

Fig 7a

| Date/Time | | | | Operations | | | | | | Manager |
|---|---|---|---|---|---|---|---|---|---|---|
| Loan# | Name | Phone # | State | Loan Type | Validator | Appraisal | Duration | Stage | Title | CTC |
| JZ445X | Jones | 203-665-7895 | AZ | Pur. | V3345 | Yes | 4 | Error | Yes | No |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |
| | | | | | | | | | | |
| Total | | | | | | Intervene Dial | Log-Off Loan Alert | | Email Intranet | Calculator IM |

| Betrice Adams UYX2008569 | July 5, 2008 |
| --- | --- |
| | 6:45 pm |

Closing Scheduler

Date ☐ Click For Calendar

Time ☐ Click For Clock

Location ☐

Loan Details

Good Faith Estimate

Pre Closing Interview

[Submit]

Closing Scheduler

Fig 8

| Date/Time | | | | | | Station# | | | | CSR-ID | |
|---|---|---|---|---|---|---|---|---|---|---|---|
| Mem ID | Name | Loan ID | State | Loan Type | Docs In | CSR ID | Validator | Errors | # | CTC | |
| JZ445X | Jones | 1993949 | AZ | Pur. | Yes | 388T | 192V | Yes | 1 | Yes | |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |
| | | | | | | | | | | | |
| Total | | | | | | Intervene Dial | Log-Off Loan Alert | Email Intranet | | Calculator IM | |

Validator
Fig 9

ACCMS State/Govt. Regulator

Date                                                                                      Time Log In State/Govt. ID  [        ]

Username  [        ]

Password  [        ]

| Date | Time | ACCMS State/Govt. Regulator | | Search | |
|------|------|------|------|------|------|
| Log-Off | | | Name [    ] | Date [    ] | |
| Email | | | State [    ] | Type [    ] | |
| | FLORIDA | | | Submit ■ | |

| Funding Date | Loan Number | Name | City | Loan Type | Lender |
|---|---|---|---|---|---|
| | | | | | |
| | | | | | |
| | | | | | |
| | | | | | |
| | | | | | |
| | | | | | |
| | | | | | |
| | | | | | |
| | | | | | |
| | | | | | |

FIG. 10a

PROCESS FOR AN INCLUSIVE AUTOMATED CONSUMER CONTROLLED MORTGAGE SYSTEM (ACCMS) CONTAINING AN AUTOMATED MORTGAGE MONITORING AND GOVERNMENT COMPLIANCE AUDITING SYSTEM

RELATED U.S. APPLICATION DATA

This application claims the benefit of Provisional Application Ser. No. 60/902,269, filed on Feb. 20, 2007.

STATEMENT REGARDING FEDERALLY SPONSORED RESEARCH DEVELOPMENT

N/A

REFERENCE TO SEQUENCE LISTING, TABLE, OR A COMPUTER PROGRAM LISTING COMPACT DISC APPENDIX

N/A

BACKGROUND OF THE INVENTION

This application relates to a method and system which provides the mortgage Consumer an inclusive "do-it-yourself" mortgage loan process whereas the Consumer is granted a means to complete a mortgage loan unassisted from the application to the closing. As is evident in the recent turmoil within the mortgage industry, blamed mostly on the subprime market, the industry is due for a change or again we will see history repeat itself. Prior art in this industry concentrates on creating tools to assist the broker, but the tools are only as good as the individual using them. One will discover throughout the World Wide Web indefinite online mortgage applications vaguely disguised as the means for a potential borrower to get a mortgage loan through whatever "mortgage company" that ultimately won the coin toss and ends up being the potential borrower's decision maker. This online process only gives the potential Consumer the ability to attempt to complete some sort of application, when in truth it is just another form of lead generation for the mortgage broker, loan officer or Mortgage Company. The majority of the time this "online" process is nothing more than a veiled attempt for the accumulation of mortgage leads that basically end up with mortgage brokers or loan officers paying for these "mortgage leads" as their means of sourcing mortgage business. Once a lead is paid for, the broker or loan officer begin a barrage of phone calls to potential borrowers in an attempt to acquire borrower's mortgage loan in order to not only pay for the lead that was purchased, but to also gain financially from closing the particular loan. Numerous problems arise from the mentioned scenario, but the most detrimental being the financial gain of the mortgage professional over the needs of the consumer.

Particularly, the present invention establishes a Consumer controlled exclusive mortgage environment that completely eliminates the tasks and fees associated with employing the services of mortgage brokers, mortgage bankers, loan officers, loan originators and Federally Chartered Banks that is today's norm, and bestows all control and the ability to complete a mortgage loan to the Consumer. Incorporated within the system is a module designed specifically for automated loan monitoring for continuous on-demand consumer support and to maintain strict adherence to the ever changing Federal and State Finance laws, a government monitoring portal is coupled with the system to allow interminable compliance auditing.

The present invention was developed to revolutionize an archaic mortgage process that is plagued with inconsistencies, human error, intentional consumer loan fraud, and complete consumer mistrust of the mortgage process in general and the professionals within the industry. A laymen's definition of mortgages would be, "the process of acquiring a home loan", but this process is much more complex than this definition and even more mysterious and confusing to the Consumer, because of the wide variety of products and programs being offered by the lenders and the inept professionals in the industry presenting these offers to the Consumer, without the Consumer's best interest at in mind. In the mortgage industry potential borrowers are either seeking a loan for a home purchase: first home, second home, investment home or they are attempting to refinance (obtain a new loan) an existing loan for a piece of property that they have previously financed or they own.

In the home purchase process the potential Consumer either, locates a home of interest and seeks to get it financed or they will attempt to get approved for a mortgage and then locate a property of interest based on the approval. This appears to be a simple process, but conflicts arise when the professionals involved in the process, Real Estate Agents/Realtors and Mortgage Professionals, compete to acquire the business of obtaining the mortgage for the potential Consumer. You have the Real Estate Agent, while a professional in their industry, however has limited knowledge in the mortgage industry; basically the agent has taken the hours needed to get a brokers or originators license, attempting to do the mortgage for their client, basically attempting to create a one-stop-shop which will enable the agent to be compensated on the real estate sale and the mortgage financing, while competing with the Mortgage professional for the same business. This competition usually is at the expense of the potential borrower by receiving misleading or misguided information only to facilitate the sale for the Real Estate Agent or the Mortgage Broker. The borrower is now being given offers and promises that usually do not exist and it is not discovered until it is too late, usually at the day of closing and due to time constraints will reluctantly close to avoid "loosing their Ernest Money Deposit" and face civil actions to force the closing.

In the mortgage refinance, the borrower is attempting to get a better interest rate than was received on the original loan, is attempting to get money out of the equity of their home or property, is trying to consolidate bills in order to better their personal finance picture, is attempting to obtain a second mortgage, or is attempting to obtain a home equity line of credit. The potential borrower is confronted with a barrage of telemarketing calls, deceiving advertisements, and again flagrant promises that cannot be fulfilled. Basically, it is the mortgage professional versus the mortgage professional trying to gain business, promising the potential borrower anything that will get the business, with the consumer's objectives and concerns last on the list of priorities, all to the detriment of the consumer who needs the transaction to be completed.

Prior art in the mortgage industry is directly focused on improving the efficiency of mortgage professionals in general, but these tools of efficiency are easily neglected as long as said professional can easily acquire a simple mortgage application, which technically all that is needed to perform the task of completing a mortgage loan. So, lost in the mortgage process, no matter what tools of efficiency are developed, is customer service, professionalism, expertise, expediency, and a lot of times honesty proven by the fact that it is common practice for a mortgage professionals to defend themselves initially with potential Consumer's based on prior horrendous mortgage experiences or stories of such experiences. In essence, a consumer is concerned about being misled in his present transaction based on the actions of a prior broker, loan officer, or originator, even when dealing with a sincere and scrupulous lender.

Furthermore, the mortgage process, in some instances, takes as much as 45 days to complete, because of the part-time broker, unprofessional broker, or in some cases the lenders representatives hinder the time factor, because of being overworked, unprofessional work ethics, loosing or misplacing customer's sensitive documents, or not having complete knowledge of their products. The consumer ends up frustrated with the process, because the consumers life as they know it is being put on hold during this process, but feels trapped or committed, because he has already submitted documents, given out personal information, or basically does not know how to rectify the situation.

Consumer loan fraud is rampant within the mortgage industry as can be validated by the records of closed mortgage businesses, heavy fines being handed down, and in some cases individual prosecutions. Of course this can be accredited to lack of knowledge of laws in the state where the mortgage is being done, lack knowledge of federal banking laws, the professional breaking the rules for personal gain, or basically the consumer is not qualified for the mortgage loan through the conventional process. Whatever the reason, it affects not only the consumer, but the whole industry in general is affected when compliance is not followed. Regularly mortgage lenders are shutting their doors due to poor practices resulting in monetary fines being imposed.

Although archaic, the process is supposed be simple: the potential borrower wants a mortgage. They locate a mortgage professional they were referred to and feel confident in. A mortgage application is taken, credit is run, the mortgage professional shops the loan with different lenders in search of the best deal to present their clients, make the presentation, collect the documents that are required to get the loan closed, get the loan conditions signed off by the lender, and schedule a closing.

Consequently, from the consumer's perspective, a mortgage system is desired in which total control of the decisions and the loan outcome are granted to the consumer, complete confidence in the loan process is realized, on demand response and expeditious service is guaranteed to the consumer. This invention will give the decision making control to the borrower, ensuring all loans are state and federal complaint, and remove all human intervention that has for decades hindered the mortgage lending process.

OBJECTIVES

The primary objective of the invention is to abolish the archaic mortgage process of present and establish as an industry standard the Consumer do-it-yourself mortgage process model.

A second objective of the invention is to provide a system and method that completely eliminates the roles, responsibilities, and tasks normally performed by the mortgage broker, loan officer, and Federally Chartered Bank from the mortgage process while giving complete control of the mortgage transaction to the Consumer, instrumentality eliminating evident conflicts of interest between the mortgage professionals and consumer, thus saving consumers up to or possibly over 9% of the loan amount in closing costs on each loan processed by eliminating all broker fees, origination fees, yield spread, and junk fees, while also expediting the mortgage loan closing process from sometimes up to 45 days to 7 days or less.

Another objective of the invention is to establish a do-it-yourself loan environment that transforms the consumer's PC into a PMC in which the consumer completes, from application to closing, unassisted all phases of the mortgage loan process.

A further object of the invention is to provide a quality control system and method, for amplified consumer security and confidence, that monitors and records all conversations between the consumer and the consumer service representative that had assistance requested while also recording keystroke and employee ID of any consumer service representative that intervened on a loan per consumer request, which will ensure the consumer is always receiving quality service, compliant advice, and guidance throughout the loan process.

Still yet another objective of the invention is to reduce organizational annual labor costs by up to 32% by eliminating traditional positions that will now be accomplished by ACCMS or in some cases the system will typically allow one individual to accomplish the tasks of a traditional 5.

And a final objective of the invention is to revolutionize the mortgage industry with a change that will reduce, or eliminate if this invention becomes an industry standard, consumer loan fraud and predatory lending, and play a major role in the reduction of yearly home foreclosures by focusing on the exact needs of the Consumer and advising against unnecessary risks instead of just focusing on loan closings.

SUMMARY OF THE INVENTION

Accordingly, the primary objective of the invention is to take the myriad of processes required in a mortgage transaction, and through technology transform this process into a simplistic and seamless form that will empower the potential Consumer with the ultimate control to not only make intelligent, informed decisions regarding a mortgage loan, but also the ability to perform all the tasks, from application to closing, unassisted without employing the services of mortgage brokers, mortgage bankers, loan officers, and the Federally Chartered Banks. This system transforms the Consumer's PC into a Personal Mortgage Company (PMC) that can perform a mortgage loan 24 hours a day, 7 days a week, and 365 days a year. Within the system, designed to derail and eliminate consumer fraud saving consumers millions yearly and assisting State and Federal officials' with the task of enforcing lending compliance laws, is a State and Federal Government regulator portal that allows around the clock loan audits remotely.

The design of the system allows it to be used as a stand alone platform or to be interfaced with Lenders that have licensing rights to incorporate said system into their business structure. In a general aspect of the present invention, the consumer's terminal or a designated kiosk is coupled to the global telecommunications network (world-wide web), allowing Consumer access to the Automated Consumer Controlled Mortgage System (ACCMS) which will establish the consumers PMC and where a mortgage loan(s) can be competed by the Consumer unassisted. In situations where customer retention is desired, the system is designed to accept payments, track payments, account and record payments for licensed Lenders that desire a member only environment as a requirement for the Consumer to complete a mortgage loan. Once the decision has been made to become a member, if that is a requirement, the consumer will go through the payment process and once that has been completed the consumer will be directed to a welcome screen which will briefly disclose the legalities of the system and direct the Consumer to the sign-up screen. If it is not a requirement of the licensed Lender that the Consumer become members, then the membership process can be disregarded and the Consumer will be directed to a welcome screen which will briefly disclose the legalities of the system and direct the Consumer to the sign-up screen. Once the consumers complete the sign-up process a unique consumer id will be generated. After the consumer id is generated. the consumer will be directed to the security section. In this security section the consumer will have 6 graphics to choose from, the graphic that is chosen will be the consumer's site key. After the client has chosen their site key they will be directed to a page where they will choose their password along with answering 3 security questions. If the consumer is ever entering their portal with on any other computer than the one designated as their primary computer, the Consumer will have to know the unique id, password and at least two of the security questions asked randomly. And it must be noted that these items will only work on the site key chosen. It must also be noted that this sign up process is only for first time users, prior users will be able to go straight to their personal mortgage environment, thus their PMC (Personal Mortgage Company), after logging in. The system will automatically generate a welcome package which will be sent to the consumer via U.S. Mail and to the Consumer PMC portal once it has been established after the sign-up process.

Once the consumer has signed up, gone through the security process, and has been "Welcomed" (approx. 12 minute process) they will proceed to a 3-4 minute multi-language tutorial that will explain the step-by-step process of completing a mortgage loan within the ACCMS environment in the language of choice. It should be noted that the Consumer's PMC has been created upon the completion of the sign-up process and from the second the Consumer has entered the portal, the Consumer has been shadowed/monitored for any assistance needed by Administrative Service Representatives (Admin) manning an administration monitoring terminal. There will be a Consumer Messenger (CM) available, a panic button, email, and phone numbers that can be called for any assistance needed all from within the Consumer PMC. Once the tutorial has been completed, the tutorial can be skipped if so desired; the Consumer can now begin the mortgage loan process. Within the PMC the Consumer will have an email client, interest rates, mortgage news, calculators, history of passed loans if any, links to FAQ's, definitions, help, "loan-in-progress" status, and a link to start a mortgage loan.

At this juncture, this summary is in regard to the potential Consumer that is attempting to apply for a mortgage loan of some sort, with the first screen being a short questionnaire pertaining to the desired mortgage, type of loan desired, home purchase, refinance, $2^{nd}$ home, investment home, $2^{nd}$ mortgage, or home equity loan. After the questionnaire is completed and submitted, the Consumer will be directed to the mortgage application (1003). It should be noted that once a Consumer has started the loan questionnaire the Consumer will be shadowed/monitored by the Consumer Service Representative (CSR) terminal. The CSR is monitoring for any needed assistance, answering CM questions, and has the ability to remotely intervene on the loan with the Consumer's permission (the Consumer will be able to view) to assist when needed.

Once the Consumer is at the 1003(mortgage application) each loan application has the Consumers' unique id, a unique loan number, and bar code that will accompany the loan thru closing, the system will lead the Consumer from space to space, a space has to be completed before moving to the next space, of the areas on the application that need to be completed along with explanations for each. (This is a smart application whereas the Consumer only needs to click a link to get an explanation for what is being asked explicitly and in some instances the system will display an explanation automatically or ask a question automatically. For example, in the area of Borrower and Co-borrower the system will ask the Consumer after they have completed filling this section to be sure that the Borrower is the individual that makes the most money. If the Consumer has filled it out incorrectly the message will also ask if the names need to be switched and if they click yes it will accomplish this task for them.) As the Consumer is filling out the application there will be a mortgage worksheet to the right showing them the numbers, debt-to-income ratios, income totals, expenses, etc. The Consumer will complete the application and come to the section that now requires that credit be pulled.

In the credit pulling process the client is pulling their own credit, but express permission will have to be given by the Consumer for this process. It will be a simple disclosure telling the clients that credit is about to be pulled to check box if it is ok to proceed. After credit is pulled, the liabilities will automatically be exported into the application and copies of the scores will be sent to the borrowers to their assigned email address. Once the credit is pulled a screen will appear with the overview of the loan. If there are any problems they will be disclosed and addressed at this time. The system will suggest solutions for any problems that arise or potential problems that the system may detect during the entire application process, for example the system will suggest paying off some bills with cash back money to lower the debt-to-income ratio or that the Consumer may just need to add another employer to the work history, but if the Consumer is in need of assistance that will be readily available from a CSR. It should be noted that if the Consumer requests assistance and the CSR has to make changes to the application, the system will ask the Consumer for permission for the intervention. If permission is given the system will voice record the conversation and record the keystrokes of the CSR to ensure security. Once the loan intervention has been completed and changes are made if any are needed, the control will be returned to the Consumer, if desired, then the Consumer will then choose to have the loan underwritten.

The loan underwriting process will take 18-25 seconds through the Lenders proprietary underwriting engine and will come back to the Consumer with an approval or referral to a CSR. If it comes back with an approval it will give a list of conditions and the rates, programs, and products available to the client. At this time the Consumer will have the opportunity to choose the program, product, and rate of their choice. Each choice will have an explanation and example for the clients to view, as well as disclosing the note rate and the APR rate on the program selected and a loan comparison worksheet, to assist the Consumer with making an informed decision. At this time the Consumers have the choice of choosing and locking the rates. On the home purchases if the Consumer has not yet found a home it will be suggested that they wait to lock the loan since the lock is for specified time duration, and cannot be facilitated without a property address. At this time the Consumer will have the opportunity to view the Good Faith Estimate (GFE) to review the fees involved with the loan. There is never any application, broker, origination, or fees associated with a loan. At this time the Consumers will be asked to review and electronically sign all state and federal disclosures. Once these disclosures have been signed, they will be automatically stored in the Consumer electronic loan file awaiting other documents needed to complete the loan file. If the underwriting engine comes back with a rejection referral, it will give the reasons, but the referral rejection will also go to the CSR who will immediately contact the Consumer in hopes of correcting any errors to rectify the situation.

At this point it is important that we distinguish between the home purchase and the home refinance. The home purchase will be discussed first at this time. If the loan is a home purchase and the Consumer has not chosen a home yet, the system will generate a loan approval certificate which the Consumer can print from their PMC. After they print the approval, if they choose to do so at the time, they can now view the MLS listing for the area of their choice. They will have the ability of keeping a list of homes that they are interested in viewing. Once they have accumulated their list of homes, they will be directed to the Real Estate Agent network and choose an agent of their choosing. The network will have the counties that the agent covers, phone numbers, fax numbers, a picture of the agent, and a guarantee that the agent will contact the Consumer within a predetermined timeframe. The Consumer will contact the agent by email and the listing of the homes of interest will accompany this email. It is important to note that in the Consumer's portal the listing of homes will be saved for future viewing and the member will have the ability to view the MLS listing at anytime from their PMC. Once the Consumer has located a home of choice and the contract purchase agreement has been completed, the Consumer will return to their PMC, which will remember exactly where the Consumer is in the process and direct it to the appraiser network. In this network the Consumer will have the ability of choosing and ordering an appraiser of its choice based on type of appraisal, cost, and location and then order the appraisal. After ordering the appraisal the Consumer will order the Title work for this particular loan.

On the home refinance the Consumer will be directed to the appraiser network where they will have the ability of choosing an appraiser of their choice, based on type of appraisal, cost, and location, and then order the appraisal. Next the Consumer will order the Title work for the particular loan. In both instances, home purchase and refinance, when the appraisal and title work has been completed it will be transmitted and received electronically into the Consumer's virtual electronic loan file awaiting remaining loan conditions to be received. The Consumer loan status section of their PMC will be updated to indicate this change of status from ordered to received, and an email will be sent signifying the change in status.

At this time for this summary it will be assumed that the Consumer will have already received and electronically signed all state and federal required RESPA disclosures and all the condition documents will have been delivered electronically to the electronic loan file. It should be noted that if the condition documents are faxed in, they will be faxed directly into the Consumer's electronic loan file that has be created by the system, with the system generated bar-coded coversheet which the Consumer has been directed to print. If the condition documents are emailed in after the Consumer has scanned them, they will be automatically separated and dropped into the electronic loan file by way of the unique bar-coding. If the Consumer has chosen to send in the condition documents by overnight carrier, the documents will be affixed with the bar code associated to the particular loan and the Consumer will print the shipping label provided from the system and once received, the condition documents will be then scanned into the Consumer electronic loan file. Based on the advancement of technology in today's households it is safe to predict that the vast majority of the condition documents will be faxed in from either the Consumer's personal fax machine or from strategically placed ACCMS computer kiosks, but if the conditions documents are mailed in and scanned into the Consumer electronic loan file, the originals will be destroyed, via secure shredders, to maintain strict adherence to Graham-Leach-Bliley Act (GLBA).

It should be noted the Loan Validator will review all documents online and never in any paper format. Once all mailed in condition documents are received and scanned into the Consumer electronic loan file thus completing the file, the system will run a Validation Test comparing information contained on condition documents to the information supplied on the mortgage application and the requirements on the loan conditions. If the system detects conflicts (errors) it will display said errors in the error queue of the validation terminal. The errors will be coded and will correlate to the areas in the loan file in question. The validator will go to the file in question, by double clicking the file number in the error queue, then click on the error code and will be taken to the exact area of conflict. The validators have the same requirements in regards to the conversation logs as the other representatives, but they will also real time update the Consumer loan status queue as to any changes, further document requirements, and conditions that have been satisfied. If there is a need for other documentation, explanation of something submitted, or anything that is crucial to the loan that is not in the file, the Consumer will receive a phone call, an email, text message, and a "loan alert" that will be sent directly to the Consumers PMC. The loan alert, which is alerting the Consumer of immediate action needed, appears in the Consumer's PMC and on the "task bar", so the loan alert will be activated whenever the Consumer logs into the PMC or logs onto their computer if it is off.

Validators will then review the appraisal to ensure conformity to company standards, thus ensuring compliance to not over-valuating the property in question. If there are egregious errors on the appraisal, the appraiser will then be taken off the company's approved appraiser list and the "fraud" will be reported to the appropriate regulators, showing our policy of zero tolerance and commitment to anti-fraudulent loans on the market. It is important to note, if any participant, whether the customer. Real Estate Agent or Appraiser, suggests any ideas that would be construed as fraud, the loan will be declined, and the regulatory agencies will be notified of such. Within the Validators terminal is a Loan Validation worksheet where the Validator will annotate finding and results of the 3 point Validation Test on each loan being reviewed and the worksheet will follow the loan through finality. Once the Validator's have reviewed the file, they will then calculate the income provided; whether Full Doc, Lite Doc (bank Statements) or Stated Doc. The review process for Full Doc will entail using FannieMae/FreddieMac (collectively FM) or Portfolio (PortF) guidelines, already coded and established within ACCMS, to annotate on the Validation worksheet the amount of income calculated from the documents. Using FM guidelines for income to debt ratios (DTI/DR) of 29/37% (or whatever the lender's requirements are for underwriting standards). the file will then pass or fail the income test, unless significant compensating factors exist to override the failure, as indicated by FM. If it passes, the file then goes to the second criteria for validation which is the asset calculation. ACCMS will have set standards for approval built into the system based on the Consumer and investors profile. Validators are to validate that the Consumer meets ACCMS's minimum asset requirement (MAR) for the salability of the loan. (The MAR tiers will be a function of ACCMS, based on the investors guidelines coded within ACCMS. (For example: 700+ FICO=2 months PITI; 660-700 FICO=4 months PITI; 630-660 FICO=6 months PITI; and <=629 FICO=10-12 months PITI). These values are coded in ACCMS (during the licensing stage) and the Validator worksheet will be annotated accordingly by the Validator ensuring the Consumer has the required reserves needed to be awarded the mortgage loan. All Consumer documents, regardless of delivery method, will be stamped by the system "True and Certified Copy of Original" as required for delivery to FM or PortF by a command from the Validator.

Once the borrower passes ACCMS' income and asset validation test, the file is screened to meet HMDA (Compliance Dept area of responsibility) requirements to prevent unfair lending practices required by HUD under the fair lending act (FLA). Once the file passes the FLA requirements, the Validator will then run the "Net Tangible Benefit" (NTB) test on the loan file, which is also coded into ACCMS. Current NTB tests have three parts: 1) Current Mortgage Payment (CMP)× 36 months vs. Proposed Mortgage Payment (PMP)×36 months (this part can have debts being paid off that the current mortgagee is still POC (paying outside of closing) on current loan). Then the total closing costs are deducted from the 36 month savings factor. If the final number is greater than the cost of the loan and those costs can be recuperated within the 36 months, the loan passes; 2) The amount of cash out, whether credit cards or true cash is larger than the total loan fees, the NTB passes. 3) If the CMP is based on an ARM loan, regardless of the duration of the ARM (adjustable rate mortgage) and the PMP is based on a FRM (fixed rate mortgage) where there is an increase of less than 150 bps between the ARM and FRM, the NTB passes.

In summary, the Validator will, within ACCMS, run the validation test on a completed loan file, review the property appraisal, run the income and asset tests on the file, and apply the NTB test to the file in preparation of closing the mortgage loan. If all passes, the Validator will forward the title order electronically to the Consumer's selected or the chosen Title Company. If borrower didn't choose a Title Company, ACCMS will default the title request to a affiliated local, regional, or nationwide Title Company with whom a strategic alliance has been formed, ensuring the lowest title fees in conjunction with the paradigms of ACCMS. Due to this alliance partnership, there will be one repository in which to order the correct titles, ensuring only essential costs associated with the Consumer's loan transaction.

With the loan parameters already in place, since the loan has been completely validated, ACCMS will order the Title electronically requesting only the information or documents needed to close the loan. (For Example: Conventional title requested a Certificate of Occupancy, Housing and Building search and sidewalk/encroachment liens. ACCMS/CND knows that only the Alta policy and H&B is needed, so ACCMS/CND does not order unnecessary and costly reports, thus saving money and proving again our commitment to cost efficiency.) The only way the title policy can be delivered to ACCMS is via electronic channels, the same way the Consumer's documents are delivered, using our bar-coding system. When the order goes out to the Title Company, the cover sheet will have a loan specific bar coding allowing ACCMS to automatically store the report in the appropriate stacking section of the loan file once received. Due to the strategic alliance, the title report will be free of clouds prior to shipment, thus alleviating hours and sometimes days to produce clean title. Once this section is completed, the file is then ready for the rate lock.

Once the file has cleared Validation and Title, an email, phone call, text message and a loan alert will be sent to the client updating them of the status of their loan, urging them to view this on line and request the client to choose their rate lock, if not already locked. All loan locks will follow licensee guidelines, prior to the issuance of CTC (clear to close) by Validator and Title Company, require a minimum 45 days to allow time for warehousing, closing, funding and delivery, all after an extensive system-wide-internal Q/C report. If this loan is already locked, we will offer a 1 time float down option. which in essence allowing the borrower to relock the loan, thus putting the control back into the Consumer's control. The Consumer will have the opportunity to "buy-down" the rate at a fee-to-rate ratio set by the actuaries on the 2ndary markets and they can "Buy-up" the rate in a similar fashion, thus decreasing the total closing costs. Once the rate is chosen, immediate notification will be sent within ACCMS to the 2ndary Market Manager (SMM) to securitize the loan (finding the investor). The SMM will then ensure the lock will cover the time needed to deliver the loan to the investors.

Once the file has been cleared by Quality Control, locked, and SMM has issued a purchase commitment, closing agents will contact the client, via loan alert, email, text message, and by phone, to instruct the Consumer to go to the Closing Scheduler within their PMC to choose their desired closing date and time, and to inform all parties involved if the closing will be at the Consumer's residence or at the appropriate Title Company. If the loan is a purchase transaction, the Real Estate Agents, Attorneys and Title closers will be sent notifications of the impending clearance of the mutual clients and directed to the ACCMS calendar scheduler program, where they will be allowed, based on assigned permissions, to be logged into the loan in question and view the final GFE and Pre-HUD and thus can prepare their docs, in our system, thus keeping all vested parties informed and active with the impending closing, thus reducing the amount of phone calls normally needed for this procedure.

When the closing is agreed upon by all applicable parties, the system will draw the State, Federal, and lender appropriate forms. The closing will then be posted in the system to allow for the system compliance review and to indicate/mark on all forms where the Consumer needs to date and sign forms. Upon completion, the docs will be delivered to the Closing Agent/Title Company (CA) to facilitate the closing. The Title Company CA will get the final lender docs, the final banker docs and the final RESPA does delivered via email, with settlement agent closing instructions. The closing agents will be instructed to get three original packages signed, leaving 1 signed package for the borrower. The instructions will inform the closing agent to deliver 1 package to the Title Company for funding, and to deliver one package to the banker for shipment (Bailee Agreement) of the Note to fund through warehouse lender.

After the closing, the closing agent will deliver one complete copy package for review, with original signatures and the Note being duly stamped "Certified True Copy (the original Note being shipped to the warehouse facility) to Warehousing. The package will be digitized and stored according to licensee requirements and for 3 years from the date of last entry. Warehousing will then review the note in preparation of funding the loan with the take out investor. By utilizing MERS, the manual, time consuming, assignment process will be eliminated. Once the loan passes RESPA compliance time frame, minimum of 4 days after funding, to allow for a truly REPSA compliant transaction. the note will be shipped to the Investor and the assignment will be recorded with MERS. Once the purchase has been executed, funds will be sent to the closing agent to settle the transaction. When the funds have been delivered and the closing agent doesn't need to make any monetary adjustment to the HUD, the file is then packaged for funding.

The Federal & State Compliance Regulator portal of the system allows all Federal and State regulators the ability to monitor the compliance of the Lender(s) to the requirements of both HUD and the States or Governing Entity. This module will effectively save the government millions of dollars by reducing the manpower needed to do Financial Audits by allowing the auditors the ability to access, via logins and passwords, the system to conduct audits in complete anonymity 24 hours a day, 7 days a week, 365 days a year. The lenders will be forced to adhere strictly to all State and Government compliance regulations.

BRIEF DESCRIPTION OF THE DRAWINGS

FIG. 5 is the view of the Admin. Monitor.
FIG. 5a is the view of the CSR Monitor.
FIG. 6 is the QC Monitor.
FIG. 7 is the Corp./Manager Monitor
FIG. 7a Operation Manager Monitor
FIG. 8 is the Closing Scheduler
FIG. 9 Validator Monitor
FIG. 10 State and Federal regulator portal log in screen.
FIG. 10a State and Federal Regulator portal for around the clock loan audits.

DETAILED DESCRIPTION OF THE INVENTION

Figure 1:
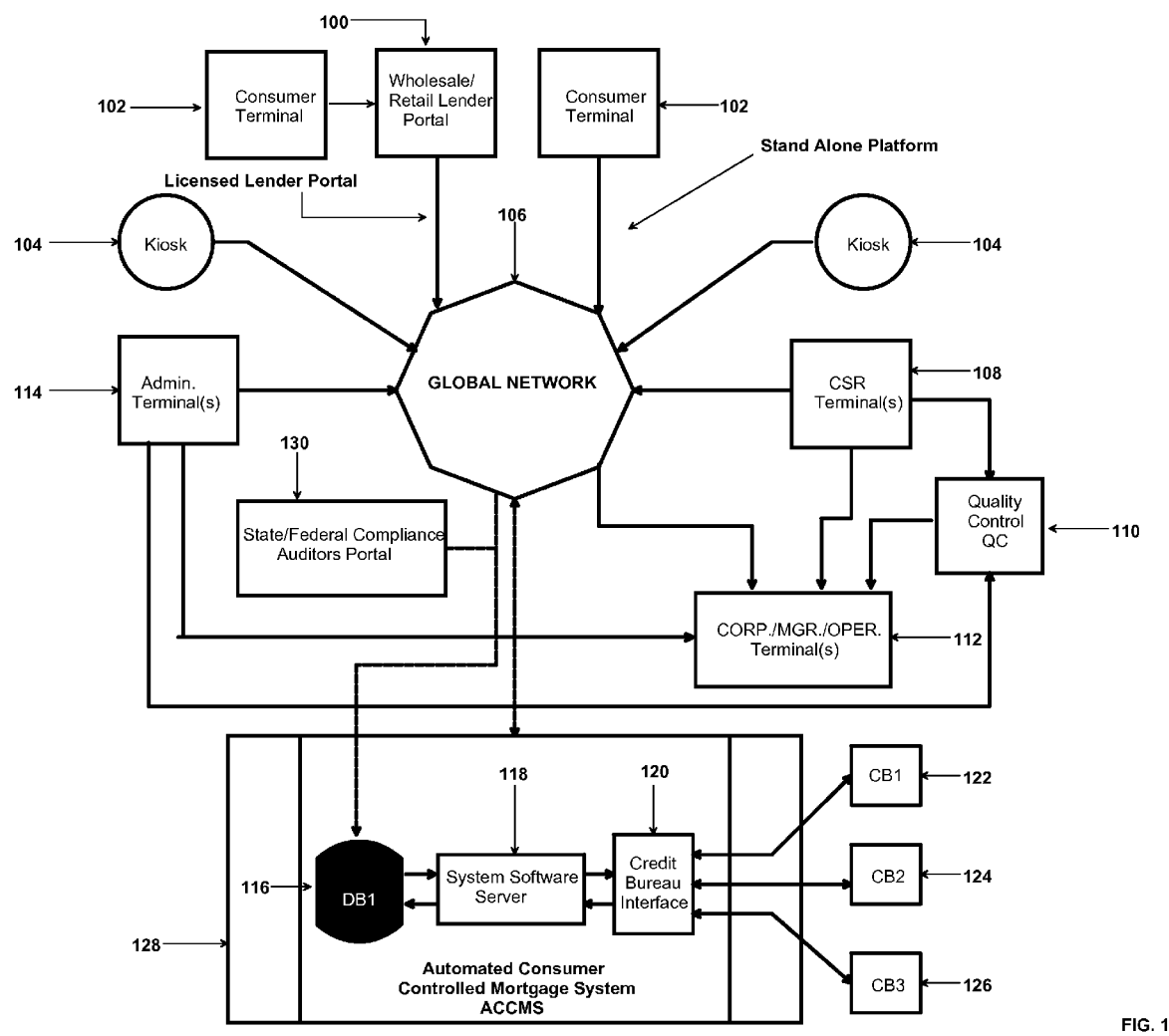
FIG. 1 is a schematic depiction of the connectivity of the ACCMS in its entirety.

In accordance with the present invention, FIG. 1 depicts as a whole, the loan origination system of Automated Consumer Controlled Mortgage System (ACCMS). The illustrated embodiment summarizes the components of the system which monitor, control, and essentially transfers the control and ability of completing a mortgage loan unassisted to the Consumer, but it is empathized that the embodiment is a Consumer tool developed to ensure the Consumer is receiving the loan which best suits the needs of the Consumer, completely eliminating the monetary gain derived from the employment of the mortgage professional, whereas with this system the origination fees, mortgage broker fees, and junk fees associated with a mortgage loan cease to exist.

Moreover, the main focus of the components of FIG. 1 is on demand assistance, system efficiency, and legal and organization compliance. It should be noted that ACCMS is designed to either function as a stand alone platform whereas a single lender will employ said system in its retail or wholesale lending business model or to be interfaced with a plurality of Lending Organizations that have licensing rights to incorporate said system into their business model.

By way of illustration it should be noted that the system can include a plurality of Wholesale/Retail Lender portals 100, Consumer terminals 102 and kiosk terminals 104. It should also be noted that by viewing the illustration it depicts the stand alone platform where Consumer terminal 102 connects directly into the ACCMS system via the Global Network 106 (internet) or the Consumer terminal 102 connects into ACCMS via the Wholesale/Retail Lender portal 100. As further explanation to the latter, the Consumer has decided to conduct their mortgage transaction with a Lender that is licensed to incorporate ACCMS within their business model, although the Consumer has chosen a particular lender, the Consumer will conduct their financial transaction unassisted with the support of ACCMS.

Patentibly important with the concept of ACCMS is the fact that the Consumer terminal 102 is in fact the Consumer's Personal Computer, which is transformed to a Personal Mortgage Company (PMC), which allows the "do-it-yourself" mortgage process once the Consumer has conducted the sign-up requirement. The PMC, which upon completion of the sign-up process develops the Consumer a secure unique portal within the ACCMS environment on their Personal Computer, permits the Consumer to complete a mortgage loan unassisted from application to closing.

Figure 3:
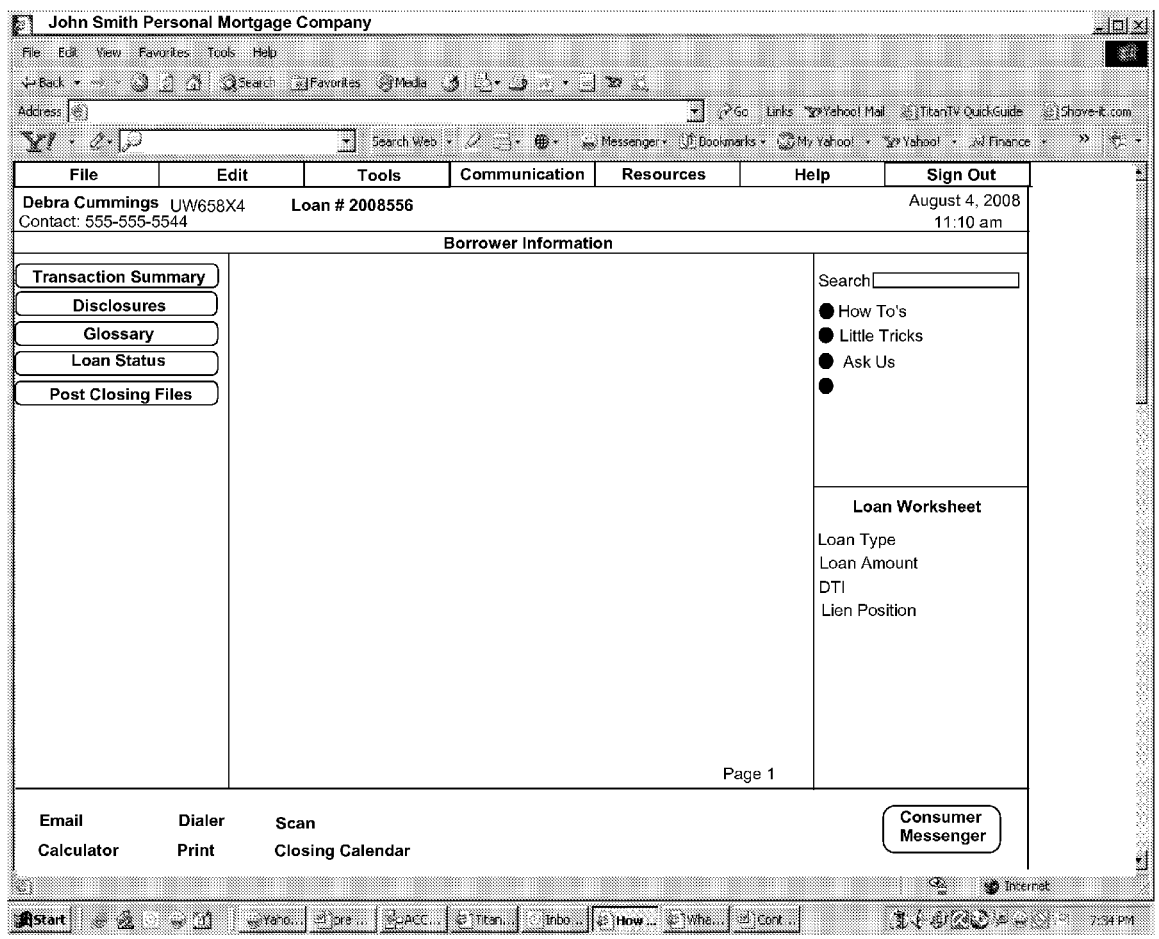
FIG. 3 Personal Mortgage Company (PMC)
FIG. 4 Kiosk

In viewing the example, FIG. 3, once the Consumer has completed the Secure Sign-up 6 the system will design the PMC in which the Consumer will have all the tools available, in simplistic form, a mortgage professional would use to complete the same process. The difference between what is viewed in FIG. 3, versus what is being done in the industry today, is the fact that in this environment the Consumer has complete control of this process, including the time of day to do the process, immediate answers to questions, no conflicts of interest, but most importantly there are no short cuts, which in turn will result in no errors.

In FIG. 3 the Consumer can perform a plurality of operations including; complete an application, pull credit, send to underwriting engine, view results from underwriting engine, print, view disclosures (with simplistic explanations), make changes and view results, scan, email, view loan conditions, satisfy loan conditions, choose Title, Appraisal, Real Estate, and Homeowner Company, add borrowers, delete borrowers, take tutorial, and can communicate with any representative on any concern 24 hours a day, 7 days a week, 365 days a year.

Moreover, another important element are the strategically located Kiosk Terminals FIG. 4 which allows the implementation or continuation of the mortgage process remotely; submission of documents, checking loan status, checking rates, scheduling closings, communicate with any representative that are assisting the Consumer with the mortgage process, technically any process that can be conducted from the Consumer's PMC can be conducted from the Kiosk Terminals.

The Admin Terminals 114 exists to monitor all activity from inception of the loan environment and assist any new or returning Consumer with questions or concerns regarding the sign-up process, monitors Consumer progression, assists with payment process issues if it is a membership environment, basically focusing all attention on any concern that will assist the Consumer with the progression to the application stage of the process. The Admin Terminal FIG. 5. of the present invention allows the monitor to shadow/monitor any potential borrower that enters the ACCMS environment initially. The primary function of this feature is to assist any potential borrower with the initial stages of the process; questions, questionnaire, payment if membership environment, with the primary objective being helping the potential borrower get to the application stage of the process.

To accomplish the important function of the invention, helping the Consumer with the application thru closing process, the CSR (Consumer Service Representative) Terminals 108 monitor the loan process from the inception of the application, assisting if requested with any question, computation, or definition that is needed by the Consumer to help in the successful processing of the mortgage loan. It is important to note that the CSR Terminals 108 monitors unlimited number of loan processes simultaneously for State & Federal compliance, loan accuracy, delivers on-demand Consumer assistance, allows Consumer requested loan intervention, and supplies loan updates and status. FIG. 5a, of the invention depicts the CSR Terminal with all the features designed to assist the borrower. Within this shadowing/monitoring environment the CSR can; view application through any stage of the process, know at all times the location of the borrower, know when the borrower is possibly in distress, can intervene in a loan to assist the borrower, communicate with the borrower, send and receive emails, communicate through the Consumer Messenger, and receive rejections and work offline.

The Quality Control (QC) terminal 110 exists to monitor and record live calls between the Consumers, the Admin., and Consumer Service Representatives to ensure company compliance, State compliance and Federal Compliance. Also, the Quality Control Terminals 110 will record keystroke and the ID of any Consumer Service Representative that intervened on a mortgage application per Consumer request, which will ensure the Consumer, is always receiving quality service, advice, and guidance throughout the loan process. Furthermore, FIG. 6, the Quality Control Terminals will assess contact performance according to prescribed specific evaluation criteria and construct statistical data to compile personalized custom reports and track trends.

Throughout the system are Corporate and Manager Terminals 112 that are in place to monitor constantly, the pulse of the system ensuring that efficiency, expediency, security, and supreme customer service is always maintained. The Corporate/Manager/Operations Terminals FIG. 7 & 7a will monitor, depending on access authority, any or all stations or terminals and is designed to also monitor terminals remotely. By selecting any line in the monitoring environment the Manager has the ability to expand the selection to monitor live or past production of the representative.

Paramount to the patent is the State/Federal Compliance Regulator Portal 130 which is the entry point for any State/Federal compliance officer or representative, which has acquired authority to audit closed loan files twenty-four hours a day, seven hours a day, three-hundred and sixty-five days a year. In accordance with the present invention, FIG. 10 & 10a depicts the State/Federal Compliance Regulator Portal 130 that allows financial audits to be performed remotely in complete anonymity saving the Governments millions yearly in travel and manpower, and would allow a greater number of audits to be performed yearly. Of greatest importance of this component is that it literally forces compliance that is adhered to randomly, but under the present scenario is easily manipulated. Upon entering the State/Federal Compliance Regulator Portal FIG. 10 & 10a the auditor has only to log-in with the Government ID that was assigned, submit username and password, and then search for closed loan files with various search means. Once the choice is made as to which loan file to audit, the auditor has only to double-click on the line of interest to be presented with the complete loan file in a viewer. Once the auditor is viewing the loan file in the view, all the tools needed to conduct the audit; calculators, calendars, means to make annotations, means to communicate with the lender, notepad, email client, conversation logs, recordings if any, and once the loan has been completed the auditor can mark the loan as being completed to deter re-auditing of same file at different time.

Within the illustrated embodiment, the ACCMS 128 is coupled to the global telecommunications network via a Terminal Server which grants or denies assess to the system.

The centralized computer of ACCMS includes a database (s) 116 and system software server(s) 118 connected to a credit bureau interface 120. The credit bureau interface is coupled to three credit bureaus used in the mortgage industry as a norm; credit bureau one 122, credit bureau two 124, and credit bureau three 126.

Figure 2:
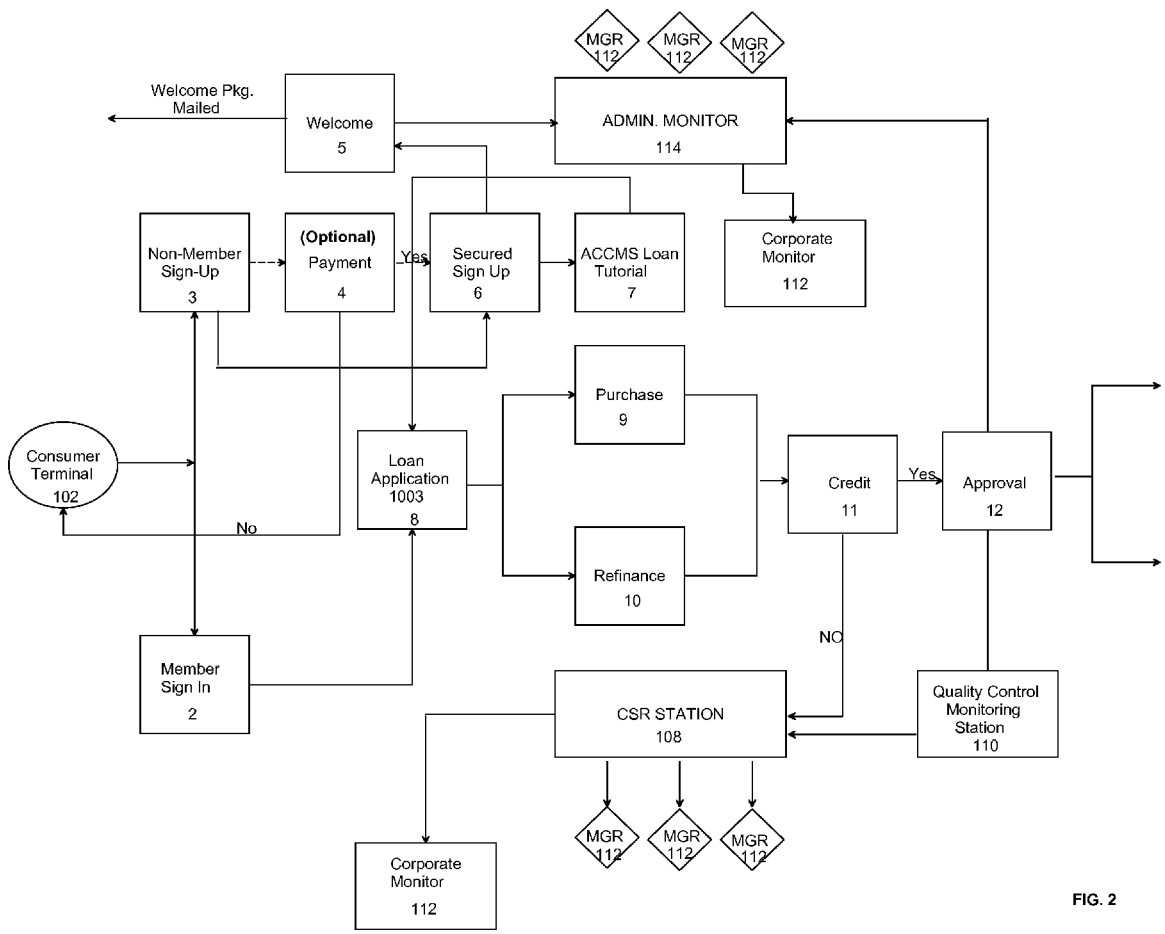
FIG. 2 is the schematic depiction of the detailed work process of ACCMS.
Figure 2A:
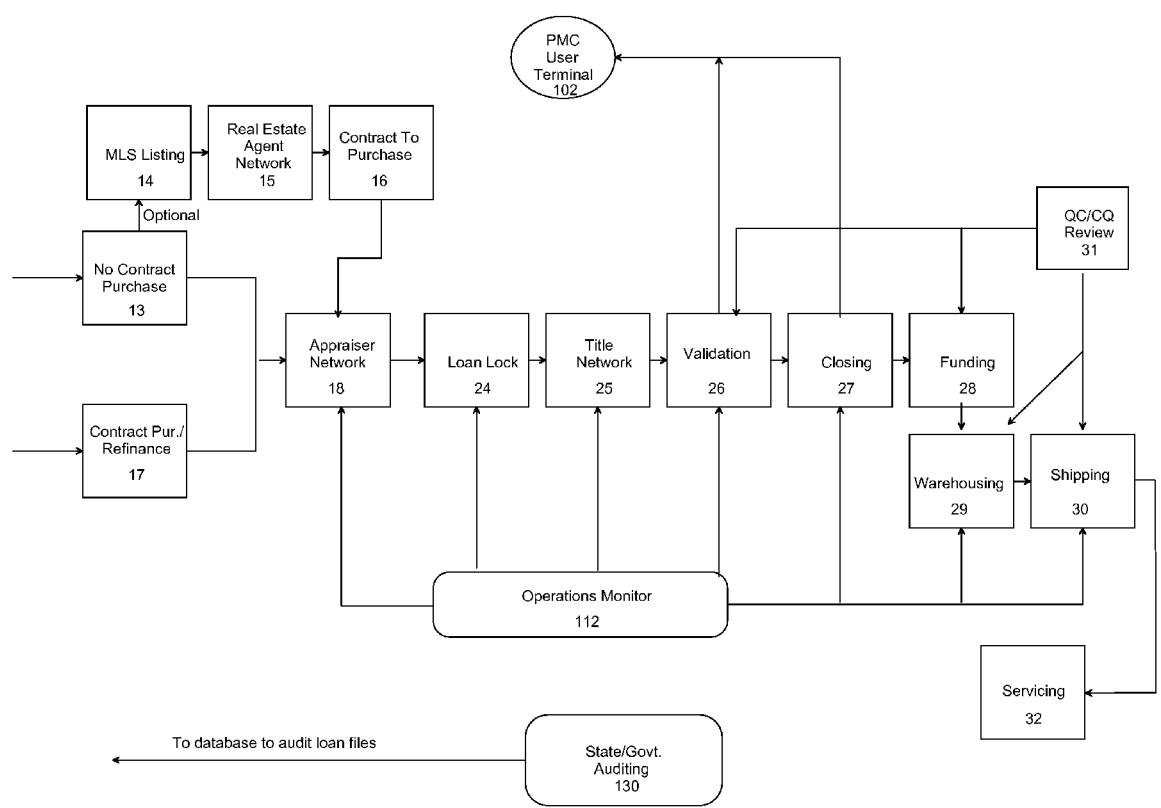
FIG. 2a continuation of FIG. 2.

The operation of ACCMS in FIG. 1 is now described with the flowcharts of FIG. 2 and FIG. 2a. The Consumer terminal 102 is the entry point to either join the environment or for a Consumer that has joined and wants to start or complete some sort of mortgage loan. The Consumer's objectives will dictate the direction of the process.

In the Non-Member Sign-up 3, the Consumer has decided to join ACCMS and will complete the multi-language sign-up questionnaire. The questionnaire is used as the basis to begin setting up the Consumer's account and will supply the information needed to help develop the Consumers PMC. Once the questionnaire has been completed the Consumer will be directed to the Payment 4 (this component is optional and depends on the desires of the licensed Lender) screen where the Consumer will choose the method of payment and enter pertinent data required for payment method. Once the payment has been accepted the Consumer will be directed to the Secured Sign-up 6 screen. If the payment is rejected for any reason the system will notify the Admin Representative to intercede and help the Consumer rectify this issue with another payment choice or another means.

It must be duly noted that the payment process is optional and if there is no payment process involved the Consumer will go from the Non-Member Sign-up 3 to the Secured Sign-up 6 screen. From this point. the new member will be taken to the Secured Sign-up 6 screen, which collects vital Consumer information that will assist in creating the Consumer's PMC and in this environment the Consumer chooses their site key, pass code, and are assigned a unique Consumer ID. The Consumer's unique id and pass code will be exported into the Post Closing Filing System residing of the Consumer's PMC for future reference. At the conclusion of the Secured Sign-up process the Consumer's PMC has been established.

In the PMC the Consumer has the ability to now process a mortgage loan, from application to closing, with the tools and assistance provided by ACCMS. After the Consumer has completed the Secured Sign-up procedure the system will direct them to the Welcome 5 screen which basically welcomes the Consumer to ACCMS and a welcome package will be generated by the system and sent to the Consumer via US Mail.

From this point the Consumer will be directed to the ACCMS Multi-language Loan Tutorial that will last approximately 4 minutes and will give a brief tutelage of the simplicity and ease of using the ACCMS. After the tutorial the Consumer will be directed to the Loan Application/1003, 8.

The first part of the application process is the application questionnaire, which will gather needed information; type of loan, borrower and co-borrower distinguishing, address, address of property, etc, that will determine the areas of the mortgage application that needs to be completed by the Consumer and which compliance disclosures are needed to fulfill State and Federal compliance laws.

Upon completion of the loan questionnaire and the information is submitted, the information from the questionnaire will be propagated into the actual mortgage application. Once in the application, the borrower must fill in the application fields one at a time, with the system directing this filling in process by guiding the Consumer to the next field to be completed by that field being in color.

Within the application environment there will be a loan worksheet to the right of the application that will show expenses, DTI, LTV, and other pertinent information. Also, the application is an Intelligent Application that will ask the Consumer questions, give scenarios, automatically do calculations, give definitions, and give advice. It should be also noted that the Consumer cannot advance to another page of the application until the page that the Consumer is presently addressing is completed.

Once the application has been completed, depending on the type of loan, the system will make the determination whether the application is for a Purchase Loan 9 or Refinance Loan 10 and this fact will determine the path of the loan through the system at this point.

Following the completion of the mortgage application, the next step will be for the Consumer to proceed to the Credit 11, where the Consumer will be presented with a disclosure that will have to be acknowledged as to understanding the credit pulling process and the Consumer will also have to agree to having their credit pulled. The credit acknowledgement is a two step process with the consumer agreeing by utilizing a check box verifying the agreement in both instances, which will become part of the Consumer's loan file for future reference if needed.

Once the credit has been pulled, 5 seconds, the scores will be emailed to the Consumer and the liabilities will be imported into the loan application. The Consumer will be able to view the liabilities by clicking "view liabilities", which will show the Consumer the PDF view of page 3 of the mortgage application.

It is important to note that if there are debt-ratio problems with the loan, the system has a automatic debt consolidation worksheet what will suggest liabilities to payoff or the Consumer can decide which debts to payoff to correct the debt ratio problems. After the credit has been pulled and if the credit scores are acceptable the loan will proceed to the Approval 12 screen. If the credit is not acceptable, the CSR terminal is alerted, and a CSR will review the application and discuss possible alternatives with the Consumer.

In the Approval 12 section of the process the Consumer will submit the application to the loan underwriting engine which will underwrite the loan based on rules established by the Lenders investors. This process should take no longer than 20 seconds and the underwriting engine will return with a loan approval or rejection.

If a rejection is returned from the underwriting engine, the rejection will be forwarded to a CSR for review and possible solution.

If an approval is returned, a list of loan conditions will be returned to the Consumer for review and selection of which to satisfy. After the Consumer has reviewed and selected which conditions to satisfy, the Consumer will be directed to the loan options available for the mortgage loan that they are applying for.

The Consumer will have the ability to not only choose the rate, term, and program, but will also be able to compare the choices with the ACCMS comparison engine to assist the Consumer with the best possible selection for their situation. The Consumer can view the Good Faith Estimate at any time to view costs associated with choices and the application worksheet can always be revisited.

If the loan is for a home purchase loan, the Consumer can wait on choosing a program and revisit the loan in progress at anytime and since it is a purchase the system will produce an Approval Certificate, which the Consumer can print and present to the Realtor that is assisting in locating the Consumer a home.

If the loan is a purchase and the Consumer has not chosen a home or real estate agent the Consumer will be directed to the No Contract Purchase 13 screen. This part of the process is an optional service to the Consumer that consists of disclosures, explain the home buying process, and give the Consumer the ability to download applicable HUD handbooks.

From this point if the Consumer chooses, they will be taken to the MLS Listing 14, where the Consumer has the ability to view home listings for any county, city, state of choice. The Consumer has the ability to save the choices and to also send the choices via email to RE agent of choice. The Consumer has the ability to return to their PMC at any time to view the MLS listing at anytime.

After their choice has been made from the MLS listings and saved, the Consumer can now proceed to the Real Estate Agent Network 15, where the Consumer has the ability to search for a Real Estate Agent by city, state, county, or zip code. The listing has professional information regarding the agent, including photograph, also the agent has been graded based on a survey conducted by the consumer at the end of the loan process on prior services performed.

The Consumer has the ability to choose the agent and notifying the agent by email, which will automatically send an "Agent Alert" to the Real Estate Agent. The agent has 4 hours to respond to the email and the alert (this is agreed upon when agent signs up to be included in the network). Since the response is completed through ACCMS, it will be tracked and timed by the system. The agent must also submit an absence notice to the listing if on vacation, etc. When the absence notice is given, the agent will automatically be made invisible on the listing until the agent has returned to their portal and submitted a reinstatement notice.

After the Consumer has located a home and a purchase agreement has been signed the borrower will log back in and go directly to the Contract To Purchase 16 screen, where the Consumer will be instructed to fax the signed purchase agreement into the system to satisfy the loan condition.

After the a contract has been signed or if this is a Contract Pur./Refinance 17 the Consumer will be directed to the Appraiser Network 18. In the appraiser network the Consumer will be able to choose the appraiser based on location, rating, price, and turn around time, also the agent has been graded based on a survey conducted by the consumer at the end of the loan process on prior services performed. When the Consumer chooses the appraiser the system will automatically send an "Appraiser Alert" that must be responded to within 4 hours, which was agreed upon in the agreement between ACCMS and the appraiser.

Once the Consumer has ordered the appraiser the Consumer will then be taken to the Loan Lock 24 screen, where the Consumer has the ability to choose a rate and lock in the loan.

After locking the loan, the Consumer has the ability to choose the title company from the Title Network 25, where the Consumer has the ability, depending on the loan, to choose the Title Company or locate the Title Company based on state, county, city, zip code, also the agent has been graded based on a survey conducted by the consumer at the end of the loan process on prior services performed.

Following the preferred procedure or the procedure described in the FIG. 2 and 2a, it is now time to validate the loan file in preparation for the loan closing. For the purpose of reviewing the loan documents submitted per the loan approval conditions attention is now on the Validation 26 where loan documents will be reviewed for accuracy of information submitted by the Consumers versus the application and the loan conditions.

In viewing FIG. 9, it should be first noted that all validation is done online and never in paper format. Once the system has received all conditional documents in to the electronic loan file, the system will run a validation check which will compare all submitted documents versus required documents. If during the validation check the system detects errors of any kind, the errors will be forwarded to an error queue in the validation terminal. The errors will be coded and will link directly to the areas in the loan file in question. The Validator will go to the file in question, by double clicking the file number in the error queue, and clear the errors in question. As the errors are cleared or worked, the loan status queue is also updated notifying the Consumer of updates, more documentation needed, or maybe minor corrections to the application are needed. The Validator will also review the appraisal that has been electronically submitted to the Consumers virtual loan file.

Once the errors have been cleared and the appraisal reviewed the Validator will now give the Consumer a "Clear To Close" (CTC) and the Consumer will then go to the Closing Scheduler FIG. 8 from within the PMC to choose the time, date, and location of closing.

After the closing time, date, and location has been chosen by the Consumer, the system will alert the Validator who will then begin working on closing the loan within the Closing 27. Once the closing has been set, since the customer has already selected the Title Company to close the loan, the system will then prepare the closing documents within ACCMS. The closing documents will be electronically sent to the closing agent, where they will be downloaded, reviewed and then packaged for a closing agent to go to the pre-assigned closing destination, as well as a duplicate copy being sent to the Consumers PMC for review prior to closing.

Funding 28, if the closed loan is a purchase or refinance transaction, the system will immediately require the settlement agent to send the required documentation to the warehouse department or investor(s) for review for compliance to licensee guidelines as well as generate a wire authorization to our warehouse investor(s) to wire the appropriate funds to the closing agent for settlement of the loan transaction once clearance has been issued based on pre-defined guidelines of the investor(s); however, if the loan is a refinance transaction, the original signed closing package will be forwarded to the funding department for final Quality Control and validation of signatures compared to the ID's provided to the settlement agent (regardless of the transaction type: purchase or refinance) to prevent fraudulent closings.

Once the file has been cleared, it will be shipped to the investor for purchase off the warehouse facility. Warehousing 29, after the loan settles, the warehouse investor(s) will be notified via wire authorization to release the funds to the settlement agent closing the loan. The Warehouse investor(s) will then track the delivery of the required documents, to them, to validate the closing transaction in accordance with the representations and warrants originated by ACCMS. The warehouse investor(s) will validate the note has been shipped to the bailee to await the time frame required to make the loan a RESPA compliant transaction (usually 4 days from the funding of the loan). Within the 4 days, the warehouse investor(s) will perform due diligence on the file for conformity to guidelines pre-described in the agreements initiated to obtain the line(s). Once due diligence has been completed, warehouse investor(s) will authorize the shipment of the collateralized note (collateral) to the investor for review and purchase, should it be deemed a servicing released loan.

If the loan is to be serviced by ACCMS Servicing 32, strict adherence to licensee guidelines will be enforced, also the loan will not be shipped and the collateral will remain with the bailee until the loan is sold in a bulk purchase, and the loan will be serviced by ACCMS, even though a securitization of the collateral will be completed by a competent accounting firm representing Wall Street investors. It should be noted, that throughout the process, all factors of the loan, Credit Score(s), Loan To Value, and Credit Quality will follow each loan and will be recorded in the database, thus making a securitization easier as all parameters of the loans required by the investors will be data mined from the records.

Shipping/Purchasing 30: File is shipped to take out investor within 48 hours of receipt of package, review outstanding purchase conditions, if any, receipt of purchase advice from investor, review purchase advice for accuracy against loan details, review carrying charges to determine interim servicing gain or loss, if loss, remove loan from line after 96 business hours to maintain compliance, if gain, review cost of funds and determine take out parameters (lock exp, market trends, etc), request purchase of loan from investor, and review timely posting of take out wire.

QC/CQ Review 31, At all times throughout the loan process, to ensure originating quality loans, ACCMS will run Quality Control procedures to mitigate the risks of the loans being originated; on the other side of the spectrum, ACCMS Credit Quality will perform reviews of closed files to ensure the ACCMS system is performing to company and licensee standards by originating only quality loans.

In conjunction with ACCMS commitment to abide by all Federal and State mandated guidelines for originating loans, ACCMS has created State/Federal Compliance Regulator Portal 130 where the auditors will have access to review files in process and closed loans in complete anonymity, thus proving ACCMS commitment to adherence to all Federal and State guidelines. No company in the industry allows this type of commitment to the Banking regulators for fear of reprisal from either fraudulent loans or loans where the disclosures are not accurate or provided timely, in accordance with RESPA regulations.

What is claimed is:

1. A computer-implemented method: wherein an individual(s) (consumer/borrower) has the ability to complete a mortgage loan from the application to the closing unassisted from any computer or device connected to the internet, resulting in the complete elimination of mortgage brokers, loan officers, loan originators, and mortgage bankers in the mortgage process, consisting of: a means to set-up the Personal Mortgage Company (PMC), by individual(s) (consumer/borrower) personal computer, establishing a do-it-yourself mortgage process; a consumer loan processing environment in which the individual(s) (consumer/borrower) has the ability to complete a plurality of functions including: completing any and all type(s) of mortgage loan application(s), lock loan, submit loan to automated underwriting, complete all financial calculations with an array of financial calculators within the Personal Mortgage Company (PMC) pertaining to mortgage loan: (a) Rent vs. Buy Calculator which will assist the individual(s) (consumer/borrower) in the determination of financial benefits of buying a home versus renting, (b) Estimated Monthly Payment Calculator will assist the individual(s) (consumer/borrower) in determining the monthly mortgage payment of the loan in which they are applying for, (c) Home Affordability Calculator will assist the individual(s) (consumer/borrower) in determining if there is sufficient income to purchase the loan which they are attempting to purchase, (d) Loan Amortization Calculator will compute the individual(s) (consumer/borrower) monthly payment, the total interest which is paid over the term of the loan plus the total amount which is paid for borrowing the money, (e) Mortgage Terms Comparison Calculator to determine the individual(s) (consumer/borrower) total cost in today's dollars of various mortgage alternatives taking into account the opportunity cost of money, (f) Bi-weekly Mortgage Calculator determines the individual(s) (consumer/borrower) potential savings and payoff acceleration of converting to a bi-weekly mortgage payment schedule, (g) Tax Savings From Mortgage Interest Deductions Calculator determines the individual(s) (consumer/borrower) potential tax savings from mortgage interest deductions, (h) Fixed Rate Mortgage vs. Adjustable Rate Mortgage Calculator assists the individual(s) (consumer/borrower) in choosing between a fixed and an adjustable-rate mortgage including factors such as loan duration, the index used by the lender, the number and timing of rate adjustments, and the assumption about the increase/decrease of future interest rates, (i) Home Mortgage Refinance Calculator helps the individual(s) (consumer/borrower) assess the impact of mortgage refinancing by taking the current loan information as well as the proposed refinance loan information to calculate the break-even point and potential cost savings from refinancing their mortgage, (j) Real Estate Investment Calculator assists individual(s) (consumer/borrower) in assessing potential return from investing in real estate, (k) Personal Debt Consolidation Calculator assesses how quickly individual(s) (consumer/borrower) can get out of debt and how much interest might be saved, (l) Cash Flow Calculator generates a cash flow statement to help the individual(s) (consumer/borrower) evaluate their personal income and expenses each month, (m) Closing Cost Calculator allows the individual(s) (consumer/borrower) to itemize the closing costs and to compare loans with different rates, fees or terms, (n) Home Equity Calculator will calculate monthly payment and rates for both a home equity loan and line of credit for the individual(s) (consumer/borrower), (o) Balloon Mortgage Calculator allows the individual(s) (consumer/borrower) to view the change in principal over the life of the mortgage, (p) Mortgage Payoff Calculator will assess for the individual(s) (consumer/borrower) how much interest can be saved by increasing their mortgage payment, (q) Cash Needed To Close Calculator will assist the individual(s) (consumer/borrower) in determining the funds needed to close the mortgage loan, and (r) Net Proceeds From Sale Of Home Calculator will assess how much money the individual(s) (consumer/borrower) have after selling their existing home, the ability to view and satisfy all mortgage loan conditions from the lender required for the individual(s) (consumer/borrower) to receive the mortgage loan and the ability to submit electronically through the Personal Mortgage Company (PMC) all documentation required to satisfy loan conditions, choose mortgage rate, choose mortgage term, choose mortgage program, choose loan closing date and time, pull credit, choose screen viewing size, adjust volume control, print, copy, cut, paste, edit, import/export, send emails, communicate through consumer messenger, makes calls through computer, receive and send alerts; a method wherein to set-up a secured personal mortgage environment with the establishment of user unique id, password, and site key; a method wherein creating and displaying an interactive multi-language tutorial that will instruct the individual(s) (consumer/borrower) of the procedures of completing a mortgage loan with the Automated Consumer Controlled Mortgage System (ACCMS); a method wherein to choose language preference; a preliminary loan questionnaire once completed and submitted will flag the system as to the type of loan the individual(s) (consumer/borrower) is applying for based on the answers given by the individual(s) (consumer/borrower) and the state that the loan is originating from in order to select the correct loan disclosures; a method wherein displaying a mortgage loan application (URLA 1003) propagated with information submitted from the preliminary questionnaire, displaying only application fields that are required to be completed by the individual(s) (consumer/borrower) for the type of loan that individual(s) (consumer/borrower) is applying for; a method wherein preventing the Consumer individual(s) (consumer/borrower) from neglecting or skipping fields on the loan application, therefore all incomplete fields must be completed before proceeding to next application page; an intelligent loan application that enables the individual(s) (consumer/borrower) to complete the loan application unassisted, while, based on the loan scenario, automatically asks the individual(s) consumer/borrower) questions that will assist, guide, and instruct in completing a mortgage loan application in its entirety and give suggestions regarding loan decisions as they pertain to the individual(s) (consumer/borrower), gives explanations and definitions of terms commonly used in the mortgage process, gives real world scenarios for loan comparison and decision making, automatically calculates and populates into the application if required: debt to income ratios, which expresses the percentage of a individual(s) consumer/borrower) monthly gross income that goes toward paying debts; loan to value ratios, which expresses the amount of a first mortgage lien as a percentage of the total appraised value of real property; combined loan to value ratios, which are used by lenders to determine the risk of default by prospective homebuyers when more than one loan is used; payment to income ratios, which compares the total mortgage payment to the individual(s) consumer/borrower) monthly income; gross monthly income, which calculates the individual(s) consumer/borrower) total monthly income before taxes; other income (part-time jobs, commissions, child support, overtime, dividend and interest, net rent); monthly housing expenses, which expresses present monthly housing expenses and predicted total monthly housing expenses with the loan individual(s) consumer/borrower) are applying for; cash out amount, which automatically be calculated and presented the amount in dollars the funds the individual(s) consumer/borrower) will receive upon refinancing a mortgage loan; monthly mortgage payments, which automatically be calculated and presented predicted monthly mortgage payments on loan applied for; hazard insurance payments, also called homeowner's or property insurance, which automatically be calculated and presented predicted monthly insurance payments; mortgage insurance, which compensates lenders or investors for losses due to the default of a mortgage loan, is automatically calculated and presented to show predicted monthly insurance payments; flood insurance, which denotes the specific insurance coverage against property loss from flooding, is automatically calculated and presented to show predicted monthly insurance payments; taxes, which automatically be calculated and presented all county and state (if applicable) taxes due on a mortgage loan; closing costs, which automatically be calculated and presented the costs associated with the mortgage transaction (above and beyond the price of the property itself) to be incurred by either the buyer or the seller; prepaid items, which automatically be calculated and presented anticipated costs such as property taxes, interest and mortgage and hazard insurance; loan amount, which automatically be calculated and presented final loan amount taking in account all fees associated with the mortgage loan; cash required to close, which automatically be calculated and presented total out of pocket expenses needed by the individual(s) consumer/borrower) to close on the mortgage transaction; subordinate financing, when the property that the individual(s) consumer/borrower) is refinancing has a second mortgage and the borrower pays off the first mortgage which automatically be subordinated the second mortgage so that it will stay a second mortgage; amortization schedule, which automatically be calculated and presented a table detailing each periodic payment of the amortizing mortgage loan; Good Faith Estimate, which automatically be calculated and presented an itemized estimated list of fees and costs associated with the mortgage loan the individual(s) consumer/borrower) is applying for; Truth In Lending Disclosure Statement, which automatically be calculated and presented all the estimated total costs of borrowing and the expected payment amounts over the life of the loan; Self Employment Analysis, which automatically be calculated and presented the net income of a self-employed individual(s) consumer/borrower) attempting the receive a mortgage loan; and which ensure that the individual(s) (consumer/borrower) completes the application in its entirety before proceeding to next step; a method wherein the individual(s) (consumer/borrower) to return at will to initiate a mortgage application or complete an application already in progress, while returning to the exact place of interruption, check the status on a loan in progress, view messages, verify loan conditions that have been satisfied or are still outstanding, and schedule a closing date and time; a method wherein the individual(s) (consumer/borrower) has the ability to communicate electronically, via phone, consumer messenger, email, and text message with any loan representative unlimited times throughout the process; a method wherein the individual(s) (consumer/borrower) to dial for assistance from system or portal; a method wherein, with individual(s) (consumer/borrower) permission, the individual(s) (consumer/borrower) personal computer is being used by the individual(s) (consumer/borrower) to complete a mortgage process to be intervened by a loan representative whereas the loan representative will take temporary control of the individual(s) (consumer/borrower) PMC to assist with the application in progress; a method wherein the individual(s) (consumer/borrower) to pull a personal mortgage credit report; a method wherein sending the individual(s) (consumer/borrower) said credit scores; a method wherein the individual(s) (consumer/borrower) to view liabilities; a method wherein presenting to the individual(s) (consumer/borrower) which or if any personal liabilities need to be paid off to obtain a loan approval with a automatic debt consolidation worksheet that will list the liabilities and balances owed giving the individual(s) (consumer/borrower) the ability to select which debts to pay off, if not all and the system will, based on the number and amount of the debts being paid off, automatically lower the debt ratios since decreasing monthly debts increases gross monthly income; a method wherein exporting liabilities into loan application; a method wherein the individual(s) (consumer/borrower) to submit loan application to automated underwriter for approval and approval conditions; a method wherein the individual(s) (consumer/borrower) to view approval or rejection; a method wherein the individual(s) (consumer/borrower) to view and choose loan program, loan product and rates based on qualification; a loan comparison worksheet which the individual(s) (consumer/borrower) has the ability to compare the financial scenario of all loan products for which they qualify, and with their present situation, chosen by the individual(s) (consumer/borrower) in order to help the individual(s) (consumer/borrower) make the most educated financial decision possible; a method wherein the individual(s) (consumer/borrower) to create an amortization schedule on loan of choice; a method wherein to view Good Faith Estimate at any time; a method that presents loan conditions based on qualifications and wherein the individual(s) (consumer/borrower) has the ability to view, choose, print, and satisfy all loan conditions associated with the mortgage loan once a program and product has been chosen by individual(s) (consumer/borrower); a method wherein the individual(s) (consumer/borrower) to print an mortgage loan approval certificate; a method which enables the individual(s) (consumer/borrower) to sign all mortgage loan disclosures electronically; a method that highlights areas on disclosures that pertain to the individual(s) (consumer/borrower) rights and any possible adverse terms related to the individual(s) (consumer/borrower) final decision, while also giving simplified explanations on some confound terminology; a method wherein the individual(s) (consumer/borrower) has the ability to print bar coded, document specific fax cover sheets for the submission of loan condition documents into electronic loan file; a method wherein viewing and printing shipping labels for any documents that will be mailed in; a method wherein the individual(s) (consumer/borrower) to choose a Title Company; a method wherein the individual(s) (consumer/borrower) to choose an Appraiser or Appraisal Organization; a method wherein the individual(s) (consumer/borrower) to choose a Home Owner Insurance Organization; a method wherein the individual(s) (consumer/borrower) to choose a Real Estate Agent/Realtor; a password protected loan status queue, which is automatically updated each time any action is accomplished on a specific loan and relayed to the individual(s) (consumer/borrower) via internal email account, text message, loan alert, Consumer IM, and phone, that displays a plurality of information concerning the loan being processed conveying to the individual(s) (consumer/borrower) any additional documentation needed to close, discrepancies, if any, with documents already submitted, conditions that have been cleared, verify what out of pocket funds are needed to close and re-calculate these funds if needed with the cash to close calculator, and a clear to close status which will convey to the individual(s) (consumer/borrower) that the loan can now be scheduled for closing and directs the individual(s) (consumer/borrower) to the Closing Scheduler in order to choose a time and date of closing; a method wherein to lock in loan; an automatic pre closing interview that highlight all significant elements of the loan in preparation for the loan closing; a post closing survey by which individual(s) (consumer/borrower) will grade third party vendors that participated in the loan process to assist in future choices of third party vendors by future individual(s) (consumer/borrower); and a method establishing a "post closing filing system" on the individual(s) (consumer/borrower) Personal Mortgage Company (PMC) that keep a transaction history and a record of all loans performed by the individual(s) (consumer/borrower), information which can be possibly useful for home mortgage tax purposes and future loans, a correspondence archive of all conversations, text or voice records for each loan performed through the individual(s) (consumer/borrower) Personal Mortgage Company (PMC), all closing documents, important phone and fax numbers pertaining to said loan(s), and a calendar reminder for important reminders such as tax due dates, insurance due dates, and rate adjustment due dates.

2. The method of claim 1 wherein the process for loan intervention wherein the individual(s) (consumer/borrower) to request the appropriate representative to intervene at anytime during the application section, which the representative to take control over the individual(s) (consumer/borrower) computer and view exactly what the individual(s) (consumer/borrower) is viewing and make changes to the application if needed during which time the individual(s) (consumer/borrower) is viewing these changes as they are being made and the conversations between the individual(s) (consumer/borrower) and representative is being recorded and the keystrokes made by the representative is being captured, which assist in any investigation on any loan should the situation arise.

3. The method of claim 1 further comprising of: a Loan Success Rating Indicator which compiles all statistical data pertaining to the individual(s) (consumer/borrower): time in job, yearly pay increase progression, debt to income ratio, adjustable rate period if applicable, pre-payment penalty if applicable, etc. and will present the individual(s) (consumer/borrower) with a logical prediction of success of the loan program that the consumer has chosen and if the systems logical conclusion is adverse, present the Consumer individual(s) (consumer/borrower) with the factors that contributed to its decision and will suggest an alternative loan program, including factors that contribute to the systems decision.

4. The method of claim 1, further comprising of: the individual(s) (consumer/borrower) has the ability to start or continue a loan application from a plurality of ACCMS computer kiosk's, the data are retrieved from the network computer and supplied information to the individual(s) (consumer/borrower), the individual(s) (consumer/borrower) has the ability to complete a loan application, the individual(s) (consumer/borrower) has the ability to submit a loan(s) to automatic underwriter, submit documentation, pull credit, communicate with ACCMS representatives, and check loan status.

5. The method of claim 1, wherein the Closing Scheduler is used by the individual(s) (consumer/borrower) to choose the time, date, and location of the loan closing, with the information electronically supplied to all parties involved in loan closing and a means for the involved parties to confirm scheduled involvement in the closing process.

6. A method for an inclusive automated consumer controlled mortgage system containing an automated mortgage monitoring and government compliance auditing system comprising of:
administrator terminals that monitor a plurality of functions within the system, wherein prior to the application stage of the process, when an individual(s) (consumer/borrower) enters any point of the system is alerted and manned by administrators whose function in the process is to assist the potential individual(s) (consumer/borrower) with any request prior or pertaining to the application process; Consumer Service Representative (CSR) terminals that monitor/shadow a plurality of individual(s) (consumer/borrower) loan processes from inception of the loan application through the closing of the loan, wherein the CSR has the ability to assist if requested with any question, computation, or dilemma that is encountered by the individual(s) (consumer/borrower) and the ability to intervene, with permission, in the application to assist in the successful completion of the loan application; Quality Control (QC), manned consistently, monitoring live calls between the individual(s) (consumer/borrower), the Admin. Specialist and the Consumer Service Representatives to ensure company, State and Federal Compliance is adhered to; Corporate and Manager Terminals are in place to monitor constantly the efficiency of the system and the representatives manning said terminals, ensuring efficiency, expediency, and security and enables appropriate company officials to run reports and observe trends to monitor overall efficiency; a status board that display/project individual(s) (consumer/borrower) in a particular loan environment and the number of applications in a loan stage; status boards which are color coded signifying and projecting the stage of the loans in process, that identifies or projects by employee id which representative is assisting any individual(s) (consumer/borrower) and at what stage of the application, that identifies or projects all interventions in progress, that monitors and projects elapsed time of consumers with an idle status within the environment and issues distress alerts if idle time surpasses the established time limit, and monitors and projects telephone line status (on hold, transfer, call duration, number of calls, calls per hour, idle time, etc); a timed conversation log completed in each instance in which a representative assists a individual(s)(consumer/borrower) and prohibits the representative from proceeding within the system unless the requirement of documenting the conversation, any action completed by the representative, and any suggestion or recommendation by the representative is met, which will become a permanent record of the loan package; method wherein the representatives to communicate and receive communication with the individual(s) (consumer/borrower) from within the monitoring stations; scripts, FAQ's, calculators, a knowledge base, and help available within the monitoring system; help desk reporting capabilities; language requirement indicator; disability requirement indicator; method wherein to display, indicate, and project the type of communication between individual(s) (consumer/borrower) and the representative assisting; previous individual(s) (consumer/borrower) return indicator; on call remote monitoring capabilities; credit report viewing capabilities; inter company messenger capabilities; a method wherein to view individual(s) (consumer/borrower) conditions; method wherein to customize manager interfaces and display desired screens and results related to the objectives of individual departments or teams; method wherein managers access to an interactive toolbar were teams can be managed using the following media: listen, record, and whisper; reporting module offers a wide array of reports based on key production elements: CSR agent reports, CSR ratios, CSR work time, CSR break time, etc; and remote supervisor monitoring capability.

7. The method of claim 6, wherein a QC monitor is used to assess and grade the individual(s) (consumer/borrower) contact performance (calls) of the representatives manning the Administration and Consumer Service Representative terminals assuring the representatives meet any established organization guidelines for compliance, quality, product knowledge, and service and record specific calls and link the recording directly to the database record consisting of; a method wherein to view conversation logs; a method wherein to construct statistical data to compile personalized custom reports and track trends; a method wherein to record calls for distress, assistance, or discrepancies; a method to record and retrieve phone calls in real time; a method wherein to configure the call recording with a maximum recording time; a method wherein to record incoming and outgoing calls manually and automatically; a method wherein to record specific representatives, all representatives, certain campaigns, randomly, or even provide an representative with the ability to record on demand; a method wherein to implement remote monitoring; a method wherein to email or export call records; a method wherein for complex search capabilities for call recording retrieval; and a method wherein to archive call data for rapid retrieval by agent, by date, by time, by date range, by time range, DNIS, phone number(s), by combinations all mentioned.

8. The method of claim 6, further comprising of: validation terminal that displays all loans which have errors in the error queue after the completed and compiled file has been processed through the Loan Validation test which compares and checks for accuracy by character recognition between the information supplied on the mortgage application (URLA 1003), the supporting documentation submitted, and the conditions for the loan; a method wherein to test the income requirement, asset requirement, and the net tangible benefit; a method to review appraisal submitted; a method wherein to review title work on property; a method wherein to assign error codes that will correlate to individual errors on documents; a real time loan status queue that updates satisfaction of loan conditions after validation; a method that alert the system when third party documents have been received within the system; a method wherein the individual(s) (consumer/borrower) is informed if further documentation is needed, if documents submitted will not suffice loan requirements, and if loan is ready to be closed; and a method wherein to create and transmit closing documents.

9. The method of claim 6, further comprising:

The State and Federal Government auditors to view loans remotely without visiting originating locations; the auditors to select/search loans by state; the auditors to select/search by loan number; the search of documents in any combination of ways; the individual state and federal entities to sign up and receive authorization to perform tasks within the auditing system; assigning usernames and passwords for Government entities; printing the documents that are authorized by Federal and State government officials; tracking and recording documents printed by the Federal and State government officials; the auditors has the ability to communicate with a particular lender from the system; and informing the lenders of auditor findings.

10. A system for an inclusive automated Consumer controlled mortgage system containing an automated mortgage monitoring and government compliance auditing system consisting:

an application server; a graphical user interface (GUI) server; a database for storing a plurality of borrower information, lender information, and loan document data; a digital platform that will be assessable to a plurality of users; means for receiving and transmitting transaction information at the digital platform; means of merging the received transaction information in the data index associated with each document; means of providing at the common digital platform a set of electronic documents comprising a data index and a set of data fields associated with the document; means of populating the data fields of the document with the information from the data index of each document; a means to comprise Extensible Markup Language (XML) or Hypertext Markup Language (HTML) documents; means for to create Mortgage Industry Standards Maintenance Organization (MISMO)-approved SMART Docs; means for to create a plurality of Lender Portal/environments for licensed users; means of applying/incorporating ACCMS into any Lenders business structure; means for to accept payments if the lender desires to create a membership environment in their wholesale or retail mortgage lending operation; means for to create individual lender accounts for any lender licensing ACCMS; means for accounting and recording all activities of various monetary transactions correlated to the lender with who the Consumer closed a mortgage loan; means for to evaluate and translate data transmitted from the loan application and credit report to the lenders underwriting engine; means for to publish and edit documents within the system; maintaining documents in a predetermined order as designated per individual lender; means for determining whether transaction information complies with a predetermined set of rules; means for permitting and propagating electronic signatures on designated documents in designated areas; means for recording the transfer of documents; means for encrypting electronically signed documents; means for storing encrypted documents in an electronic vault; means for recording the transfer of encrypted documents; means for designating who will have access to certain documents, procedures, and processes; means for tampering sealing documents; means for determining if tamper-sealed document has been edited subsequent to tamper-sealing; messaging management monitors of tamper sealed document editing; means for creating individual electronic individual(s) (consumer/borrower) loan file; means for selecting the compliance disclosures that correlates to the state that the loan is originated in; means for establishing and capturing individual(s) (consumer/borrower) site keys; means for establishing and capturing individual(s) (consumer/borrower) ID's and passwords; means for associating individual(s) (consumer/borrower) ID's with corresponding loans; means for assigning bar codes to loan documents; means for assigning bar coded loan documents with corresponding loan file; means for correlating bar codes with corresponding individual(s) (consumer/borrower) ID's; means for automatically creating individual(s) (consumer/borrower) welcome packages; means for to display all activity within the system to appropriate display monitors; means for automatically assign incoming and outgoing telephone calls to appropriate environment means for displaying and projecting all incoming and outgoing phone calls to appropriate representative; means for to dictate who will have access to certain loan environments; a method that will track all printing within entire system; means for to track and record all documents faxed from and to the system; means for to place all faxed loan documents with appropriate bar code in corresponding loan file; means for to track and record documents mailed in and input into the system manually, and by whom performed the manual input; means for to track and log all loan interventions; means for to voice record all loan interventions; means for the individual(s) (consumer/borrower) to request and view a loan intervention; means for to compress all voice recording, logs, and store with electronic closed loan file; means for to archive call data for rapid retrieval; means for to complex search capabilities for call recording retrieval by agent, by date, by time, by date range, by time range, Dialed Number Identification Service (DNIS), phone number(s), or by combinations all mentioned; means for to associate extensive time in any area of the application as a possible need for assistance and will automatically contact individual(s) (consumer/borrower) inquiring if assistance is needed; means for automatically creating fax coversheets for loan docs with the loan bar code, individual(s) (consumer/borrower) id, and loan number(s) that have been assigned for the loan in process; means for to correlate loan type and what areas are to be completed on the loan application based on answers from the loan questionnaire submission; means for to propagate data from loan questionnaire to actual loan application; means for to validate all documents submitted, match information submitted on loan applications; means for to create a loan validation queue that will post all loans with errors that need addressing;

a method to create validation error codes; means for to link the error to the actual location on loan application or document submitted; means for the individual(s) (consumer/borrower) to choose a third party vendor; means for the submission and accepting of third party orders; means for to create a Home Insurance Portal/environment; means for to create a Appraisal Portal/environment; means for to create a Title Company Portal/environment; means for to create a Real Estate Agent/Realtor Portal/environment; means for to create a grading system for third party vendors, which are the results of the individual(s) (consumer/borrower) Survey completed at the end of the loan process, which will grade the third party vendor on reliability, accessibility, knowledge, punctuality, etc. and used by potential individual(s) (consumer/borrower) in deciding their choice of vendors for their mortgage loan; means for uploading and downloading of files and documents from third party vendors; means for to create completion alerts; means for to create loan approval certificates; means for to create a closing calendar in which the consumer selects the closing date and time of closing which will in turn alert all parties involved in the event; and means for to create and deliver closing documents electronically.

11. The system of claim 10, further comprising: creating an electronic loan file that divided into a specific stacking order; storing all loan documents, assigning and storing appropriate state disclosures once the individual(s) (consumer/borrower) begins a new loan; the individual(s) (consumer/borrower) faxes or scans documents directly into the electronic loan file; rotating and resizing all documents into the appropriate stacking order using the Optical Character Recognition (OCR); assigning bar codes, loan id, and the individual(s) (consumer/borrower) id to the appropriate file; and automatically run the Validation Test when all documents have been received.

* * * * *